FIG. 1

INVENTOR.
CHARLES L. DU VIVIER

FIG. 2b

INVENTOR.
CHARLES L. DU VIVIER
BY Edward H. Cairns
ATTORNEY

INVENTOR.
CHARLES L. DU VIVIER
BY Edward W. Eames
ATTORNEY

March 15, 1966  C. L. DU VIVIER  3,241,109
TRAFFIC ACTUATED CONTROL SYSTEM
Filed Aug. 18, 1961  8 Sheets-Sheet 5

*INVENTOR.*
CHARLES L. DU VIVIER
BY Edward W. Pauro
ATTORNEY

FIG. 7

INVENTOR.
CHARLES L. DU VIVIER
BY Edward H. Eames
ATTORNEY

*INVENTOR.*
CHARLES L. DU VIVIER
BY Edward H. Eames
ATTORNEY

INVENTOR.
CHARLES L. DU VIVIER
BY Edward H. Eames
ATTORNEY

United States Patent Office 3,241,109
Patented Mar. 15, 1966

3,241,109
TRAFFIC ACTUATED CONTROL SYSTEM
Charles L. Du Vivier, Darien, Conn., assignor to Laboratory for Electronics, Inc., Boston, Mass., a corporation of Delaware
Filed Aug. 18, 1961, Ser. No. 132,410
16 Claims. (Cl. 340—37)

This invention relates to traffic control systems and apparatus and more particularly relates to improved apparatus of the traffic actuated type for according right-of-way signals along one street or traffic phase and for initiating a transfer of right-of-way to another street or phase when the spacing or gap between successive vehicles on the first street increases so as to exceed an allowable or permissible gap.

Although applicable in some aspects to simpler types of intersections, the invention is particularly significant for intersections of heavily travelled multi-lane streets.

One form of traffic control system uses a traffic signal controller for according "go" or green signals alternately along two intersecting streets for permitting closely spaced groups or fleets of vehicles to travel along said streets alternately through the intersection, initiating a termination of right-of-way along the respective streets when the spacing between the moving vehicles increases (as by passage of the fleet) above an allowable gap. Transfer of right-of-way from one street to the other depends in part on the demands of traffic waiting on the other street as well as on the spacing of vehicles moving on the one street, so measurement of both the number and time of vehicles waiting on a red or "stop" signal on the other street determines the allowable gap. In addition the allowable gap may be determined by the average spacing of vehicles flowing along the street having the right of way; if the actual gap is substantially greater than the average gap it indicates the end of a fleet.

The actual gap between two successive vehicles flowing on one street is compared with three allowable gaps as determined by the average gap of a group of vehicles flowing on the one street, the time that the first vehicle has been waiting during the red signal on the street intersecting the one street, and the number of cars waiting on the interescting street. Each of these measurements by varying the allowable gap thus creates a varying demand on the traffic controller to yield on a green signal at an earlier time. In particular the circuitry for comparison of the actual gap with the three allowable gaps includes an "OR" circuit so that transfer of right-of-way is initiated when the actual gap exceeds any one of the allowable gaps.

In such a system when the gap between successive vehicles exceeds the allowable gap, a passage time is introduced to permit the last vehicle to pass through the intersection before right-of-way is transferred.

Since intersecting streets often each include a plurality of traffic lanes, the gap measurement between successive vehicles is preferably limited to vehicles in the same lane and accordingly the traffic measuring means are referred to as lane timers.

When the demand for transfer of right-of-way from a phase is controlled by the average gap between groups of vehicles on this phase being exceeded by the actual gap between two successive vehicles on this phase, precise comparison circuitry is required since both quantities are generally varying the same direction but at different rates. Accordingly the circuitry must sense the difference in rates. Where it is desired that transfer of right-of-way occur when the actual gap exceeds the average gap by some predetermined percentage the problem is increased since the same percentage difference at different levels of gap produce difference signals of varying magnitude for comparison making calibration difficult. Accordingly, one aspect of this invention provides that an average gap circuit remember the average gap measurement which exists when a vehicle passes the detector in the lane and hold this average measurement between actuations as a steady state rather than varying quantity. Accordingly the comparison is between a varying quantity representing actual gap and a fixed quantity representing average gap thus eliminating one of the variables and permitting percentage difference calibration over a wide range of gap differences. In addition, this improved circuitry provides a more accurate and sharper indication of gap differences since when the actual gap between successive vehicles is increased, the average gap circuit remembers the average gap as of the last actuation which is at a higher value.

Previously separate timing circuits have been used for measuring the vehicle gap and passage time. However, one aspect of this invention recognizes that the gap timer is initiated by the passage of a vehicle over a vehicle detector which vehicle is approaching the intersection and may be used to provide a passage time. In particular this invention utilizes a gap-passage capacitor charging from a negative level toward ground and superimposes this charge curve upon an adjustable positive source to vary the level of the charging curve thereby varying the passage time. This adjustment of the passage time of the individual lane timers permits a longer passage time in some lanes and a shorter time in other lanes, as for example curb or turning lanes versus straight through lanes.

A further aspect of the invention relates to an improved circuit for measuring the number of cars waiting on a red signal for controlling the demand on the green phase for transferring right-of-way by varying an allowable gap in proportion to the number. However, traffic lanes vary in the amount of storage available thereon so that ten cars, for example, waiting on a short street or an exit from a throughway should have more effect than the same ten cars on a long street, for example. Accordingly, this invention provides that the number of cars circuit provide an output which is a percentage of some preset quantity representing a characteristic of that particular lane as for example the number of cars capable of being stored on such lane or the limit of the number of cars stopped on such lane after which a demand for green is called for.

A still further aspect of the invention relates to improved passage time control by one of the lane timers to terminate the green. Since each of the lane timers has a passage timer, the invention provides that the green signal is terminated after the passage time of the last of the lane timers to indicate a desire to yield the green as when the actual gap in all of the lane timers has exceeded its allowable gap. Accordingly the passage time is controlled by the heaviest traveled lane. An additional aspect of this invention provides that as the controller is terminating the green under control of this last lane timer, apparatus is provided to check or sense whether the other timers in the same phase have completed their passage time. Such unexpired passage time results in automatic recall of the traffic controller to this phase to remove any vehicles which did not have sufficient passage time.

An additional aspect of this invention is the provision of a linear gap timing circuit which is reset by each vehicle actuation and in which reset is blocked by apparatus calling for a termination of right-of-way.

Another aspect of the invention relates to circuitry in each lane timer for comparison of the actual gap with a plurality of allowable gaps which are varying respectively with a plurality of traffic measurements which may include measurements on both intersecting streets so that when the actual gap in a lane exceeds any one of its allowable gaps a demand for yielding the green or for initiation of transfer of right-of-way is called for, and when all of the lane timers have indicated such a demand, transfer of right-of-way is initiated and right-of-way is subsequently terminated after the passage time of the last of such lane timers to indicate such a demand.

Other aspects of this invention relate to novel circuitry interconnecting the various lane units and novel timing control circuits.

Accordingly an object of this invention is to provide an improved traffic control system.

Another object is to provide an improved average gap or average volume circuitry for a group of vehicles.

A further object is to provide an improved gap timer having linearity over a wide range of gaps.

A still further object is to provide improved circuitry permitting a comparison of the average gap with the actual gap particularly when it is desired to provide an indication of such comparison for various percentage differences between the two over a wide range of input linear values representing such quantities.

Another object is to utilize one condenser for both passage and gap timing.

A further object is to provide improved circuitry for counting the number of vehicles waiting.

Another object is to provide novel circuitry for terminating the green after the passage time of the last of the lane timers to indicate a desire to yield.

The above mentioned and additional objects and advantages will be apparent to those skilled in the art upon reading the following detailed disclosure of which.

Figure 1:
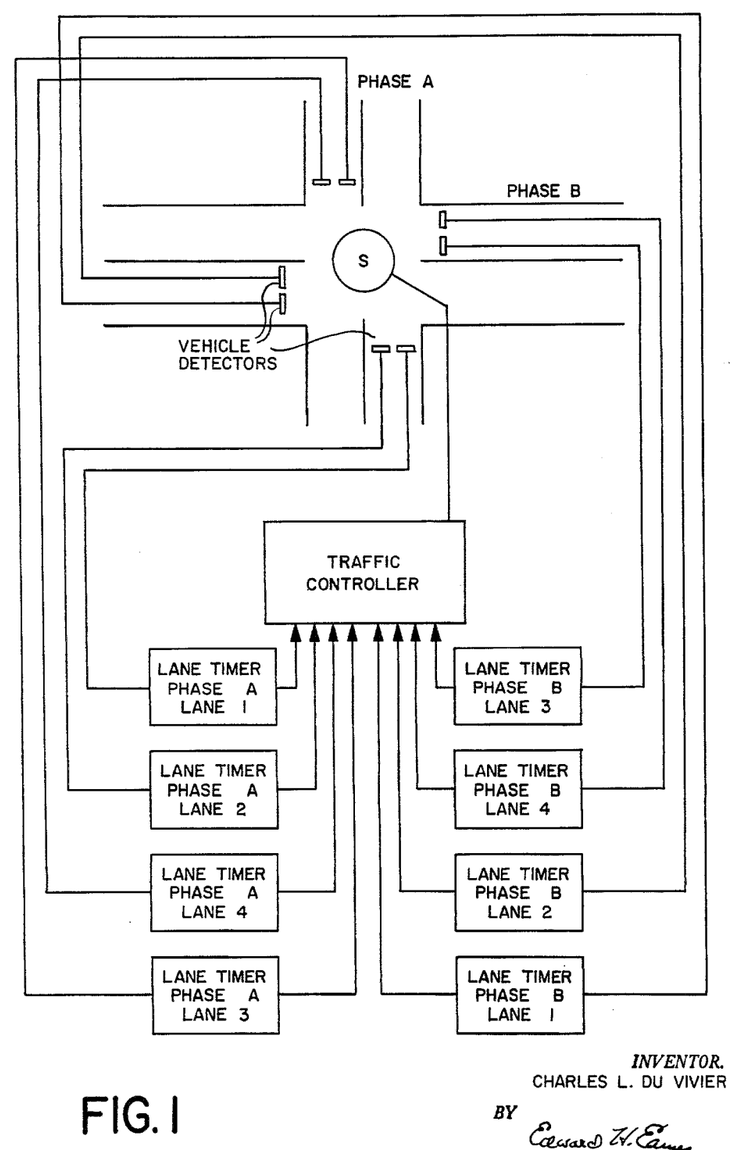
FIG. 1 is an intersection layout showing the traffic controller and traffic signal and the associated vehicle detectors and lane timers.

FIG. 1 illustrates in block diagram an intersection of two streets with a traffic signal to alternately provide "stop" and "go" signals at the intersection controlled by a traffic controller. Each of the streets includes two lanes for traffic in the two opposite directions along the street. In each traffic lane there are vehicle detectors which are in, above, or adjacent their respective lanes and these detectors control their respective lane timers. Thus the vehicle detector in lane 1 of phase A controls Lane Timer Phase A Lane 1, etc. The output from these lane timers then control the traffic controller. As will be shown later in the detailed disclosure, lane timers of phase A may control the lane timers of phase B but such connections are not shown in FIG. 1 in order to avoid an extended discussion as to their purpose.

Figure 2A:
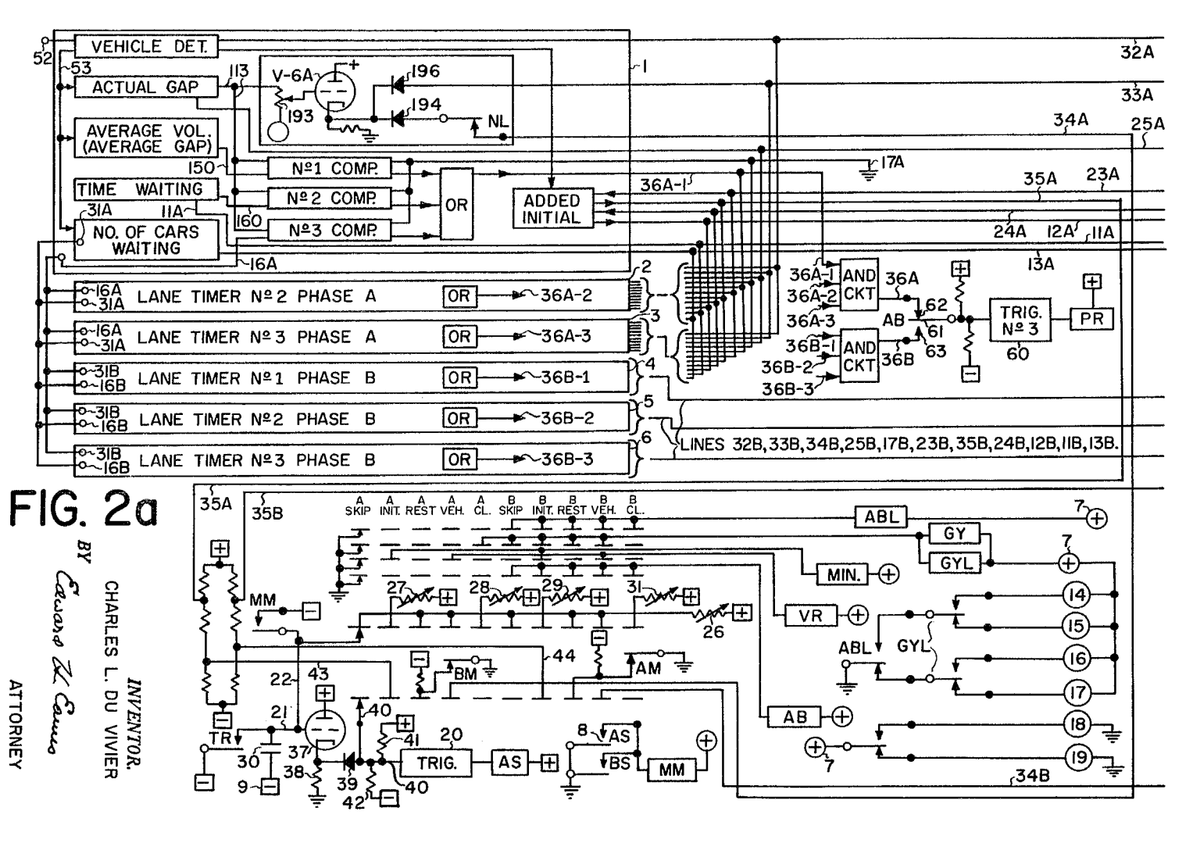
FIGS. 2A and 2B when placed together as shown by the lines common to both drawings show partly in block diagram and partly in schematic diagram the overall cooperation of a plurality of lane timers for both phases cooperating with the traffic controller.
Figure 2B:
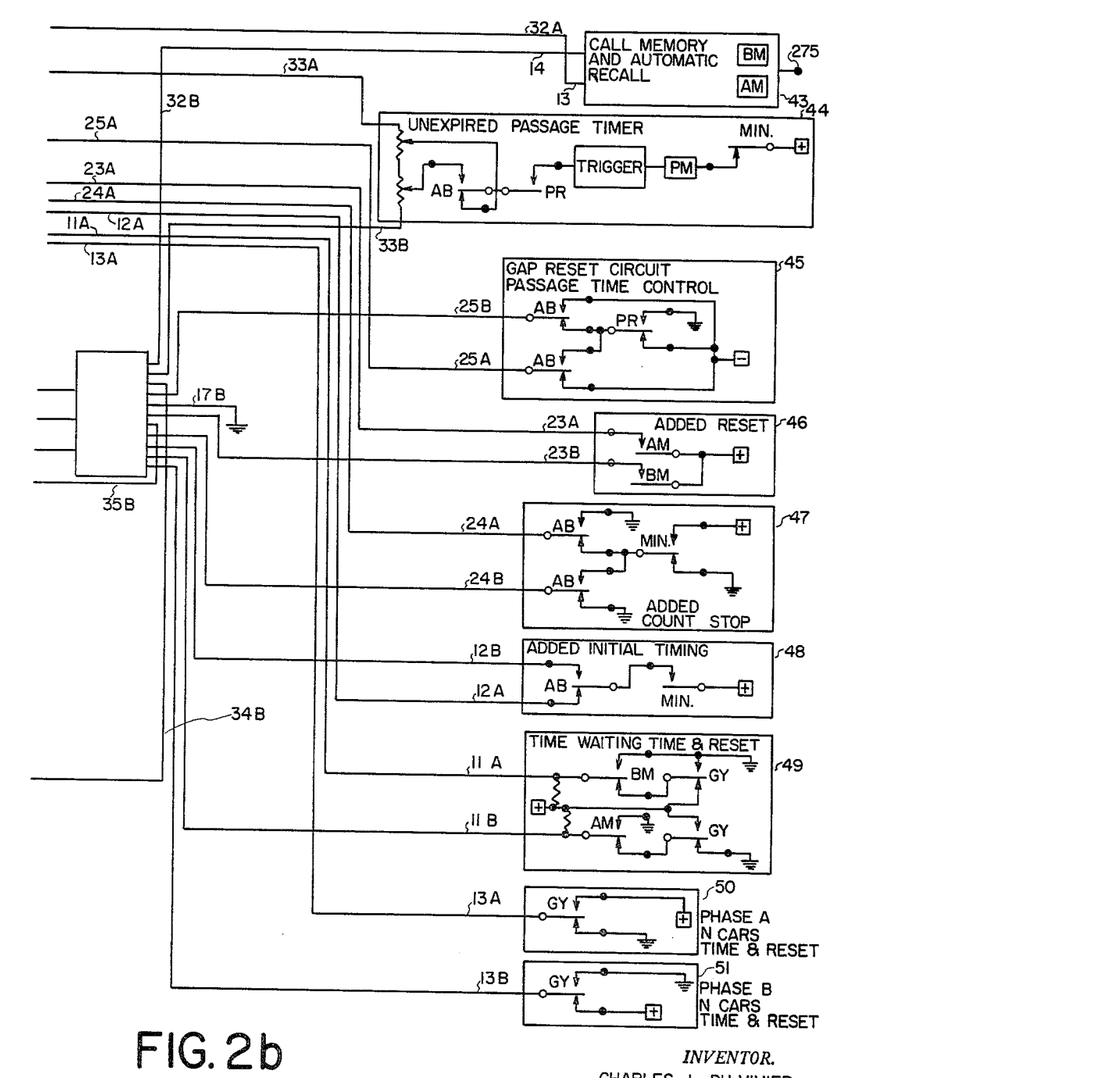

FIGS. 2A and 2B when connected or placed together illustrate the connections of a Volume-Density type traffic controller for controlling traffic signals in two or more phases (streets or directions) at an intersection in response to traffic measurements by individual lane timers associated with the individual traffic lanes of the several traffic phases as was shown in FIG. 1.

The lane timer associated with lane #1 of the "A phase" at an intersection (as for example a north-south street) is shown at 1 with its component elements in block diagram. The lane timers 2 and 3 are associated with lanes 2 and 3 of phase A while the three lane timers 4, 5 and 6 are associated with lanes 1, 2 and 3 of phase B. Lane timers 2–6 are shown in block form although it will be appreciated that they are similar to lane timer 1 in phase A. Also, while three such lane timers are shown for each phase, the invention may be used with only two or one or more such lane timers for each phase. The preferred form of specific components with each lane timer are shown subsequently in FIGS. 3–7.

The Volume-Density type traffic controller is shown in FIGS. 2A and 2B; this controller includes a conventional telephone line switch with ten positions and six banks in FIG. 2A for providing the conventional sequence of red, yellow, and green signals for right-of-way and clearance for one traffic phase in the first five positions and for the other traffic phase in the last five positions. In addition, the controller includes a plurality of control circuits in FIG. 2B for cooperation with lane timers.

Looking first at the Volume-Density Controller, it is seen that position 1 of the lineswitch is a skip position, position 2 provides an "initial" green period on the "A" phase, position 3 is an "A-rest" position, position 4 provides A-green for a "vehicle" period and position 5 provides a yellow signal for clearing the A phase while phase B remains red. Similarly, positions 6–10 provide the same sequence of signals for phase B while phase A remains red.

The circuitry for providing this sequence of traffic signals includes the lamps 14–19 which are alternately connected between ground and an A.C. source 7 in the desired sequence depending upon operation of relays ABL and GYL. Relay ABL is energized from bank 1 of the lineswitch (the top bank) in positions 6–10 while relays GYL and GY are energized from bank 2 of the lineswitch in positions 5–9. For example, in positions 1–4 of the lineswitch both relays ABL and GYL are deenergized thereby illuminating the A-green lamp 17 and B-red lamp 19; in position 5, relay GYL is energized and ABL remains deenergized thereby maintaining the B-red lamp 19 illuminated while now illuminating A-yellow lamp 16; in positions 6–9, both ABL and GYL are energized to thereby illuminate A-red lamp 18 and B-green lamp 14; in position 10, only the relay ABL is energized thereby illuminating B-yellow lamp 15 and A-red lamp 18.

The lineswitch is stepped from one position to a succeeding position by operation of motor magnet MM which in turn is controlled by the closure of contact 8 which is operated by the AS relay. The AS relay in turn is controlled by a trigger circuit 20 which operates after the timing of various periods has been completed. Accordingly the amount of "green" time which is provided in any particular position of the lineswitch is determined by a timing circuit which controls the operation of trigger #20. Various timing circuits control this trigger circuit as will be shown subsequently.

Relay AB is energized from bank 4 of the lineswitch in positions 6–10 so that it acts to indicate to the lane timing units whether the traffic controller is providing "green" (or red) to the A phase of B phase.

Relay "MIN" is energized on bank 3 in positions 2 and 7 of the lineswitch thereby indicating that the controller is either in the A or B initial position; in such initial positions a minimum time is provided for the vehicles to get moving into the intersection after which additional time may be added.

Relay VR is energized in positions 4 and 9 of bank 3 of the lineswitch to indicate that the controller is in either the A or B "vehicle" period. It is this time period which is terminated by the vehicle gap exceeding the allowable gap.

Banks 5 and 6 of the lineswitch provide the timing of the green periods by determining the time at which trigger 20 energizes the AS relay which in turn energizes the motor magnet MM of the stepping switch. In operation, the "timing" is provided by condenser 30 which has one side connected to a negative D.C. source 9 for charging over lines 21 and 22 to the rotor contact of bank 5, and from the stationary contact of such bank to one of a plurality of resistors to a source of positive D.C. voltage. In positions 1, 3, 4, 6, 8, and 9 on bank 5 of the lineswitch, condenser 30 charges through skip resistor 26; in position 2, the condenser 30 charges through A-MINIMUM timing resistor 27 while in position 5 the condenser circuit includes A-yellow resistor 28; in positions 7 and 10, the condenser circuit includes the B-MINIMUM and B-yellow resistors 29 and 31.

The potential on condenser 30 is increasing in a positive direction (from the negative source 9) at a rate determined by the resistors connected over line 21 to the grid of cathode follower 37. Accordingly, the voltage across resistor 38 follows these charge variations. However, this voltage on the cathode is not applied directly to the trigger 20 because of the polarity of diode 39. Diode 39 therefore serves an important function of controlling the voltage on line 40 and the input to trigger 20 as will become apparent.

Line 40 is connected to the moving contact of bank 6 of the lineswitch and to the input of trigger 20; line 40 is also connected through a resistor 41 to positive D.C. and resistor 42 to minus D.C. Accordingly a bleeder circuit is provided from the positive source through the resistor 41, line 40, through diode 39 and through the cathode resistor 38 to ground. Since the voltage drop in diode 39 is small, the voltage on line 40 follows the voltage across resistor 38 which in turn follows the voltage on capacitor 30. Therefore trigger 20 may fire to energize the AS relay and step the lineswitch at time intervals determined by the charging of capacitor 30 through the resistors in bank #5.

However, in positions 2, 4, 7, and 9 of bank #6 (A initial, A vehicle, B initial, and B vehicle positions) there is an additional factor controlling the voltage on line 40; the added initial output on line 35A from phase A lane detectors provides a voltage on line 43 while the added initial output from phase B lane timers provides a voltage on line 44 in positions 2 and 7 of bank 6; in addition there is provided a lane passage signal on line 34A from the phase A lane detectors in position 4 of bank 6 and a last lane passage signal on line 34B from the phase B lane detectors in position 9 of bank 6. The added initial timing circuit serves to extend the initial green period for a time proportional to the number of cars waiting on a lane of a street.

These latter circuits are arranged to insure that the timing circuit provided by bank 5 and the added initial (in position 2 or 7) or the Last Lane Passage Timing circuits (in positions 4 and 9) shall both have timed out before relay AS steps the lineswitch to the next position. For example, the added initial and the last passage circuits 34 and 35 each provide an output of voltage which increases in a positive direction with time; these outputs are connected through diodes having their anodes connected to the stationary contacts of bank #6 as shown for example in the Passage Timer above. Thus if capacitor 30 has timed out by charging through the resistors of bank 5, and the added initial (in position 2) has not timed out, the diodes in the added initial circuit will reduce the voltage on line 40 to the value of the added initial voltage. Accordingly trigger 20 and the AS relay can not be energized until added initial has timed out. Also since the added initial output of all the lane timers of one phase are connected in parallel, relay AS is prevented from firing until the added initial of all the lane timers of that phase have timed out. Similarly the passage time voltage controls line 40 in position 4.

The master controller also includes a conventional memory circuit and automatic recall 43 (shown in FIG. 2B) which remembers whether the controller is in A phase or B phase by energizing either the AM or BM relays.

An unexpired passage timer circuit is shown at 44. As will be shown subsequently each of the lane timers has a passage timer which permits the last vehicle (in position 4) to cross the intersection after actuating a detector. However, the passage time utilized is only that of the last lane timer to exceed its allowable gap; accordingly the unexpired passage timer serves to check the other passage timers on lines 11A and 11B which were not utilized; if their time is unexpired, passage memory relay PM is deenergized to effectively place a call in memory 43.

A gap reset circuit 45 is provided which resets the gap circuit by providing ground on line 25A or 25B to generate a passage time in position 4 of the lineswitch since in this position the PR relay is energized when each of the lane timers on one phase have indicated a desire to terminate green on that phase.

Figure 8:
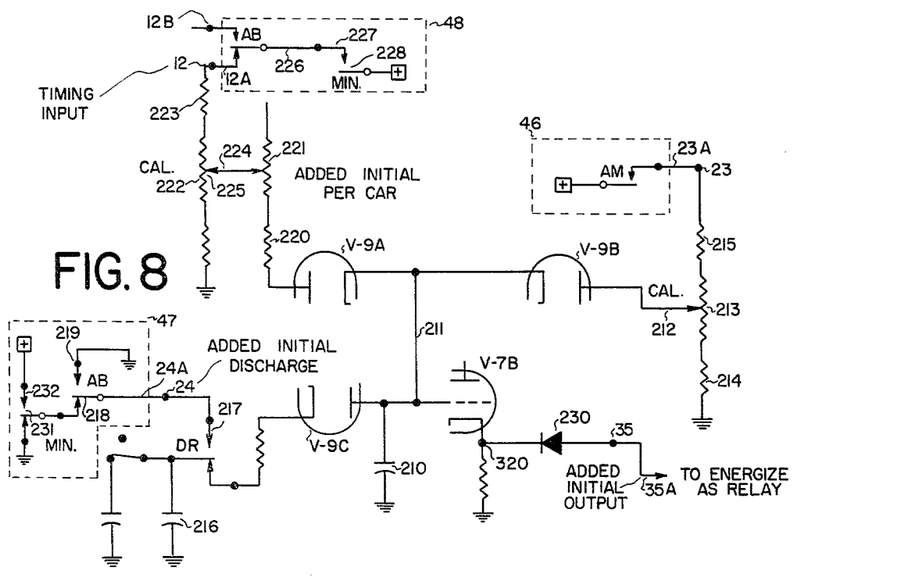
FIG. 8 is a schematic drawing of the "added initial" circuit.

A circuit is provided at 46 to reset the added initial circuit on line 23A or 23B in the lane timers when the master traffic controller switches from A phase to B phase as will be shown in FIG. 8.

An added count stop circuit is provided at 47 as will be shown in FIG. 8 as well as the circuit at 48.

A time waiting control circuit 49 is provided which connects B+, alternately to lines 11A or 11B to initiate a time waiting time period in the lane timers of the A phase during a green signal on such phase (GY relay deenergized) after the first vehicle appears on the B phase (relay BM deenergized). Similarly B+ is connected to line 11B during a green signal on phase B (relay GY energized) after the first vehicle appears on phase A (relay AM deenergized). Whenever B+ is not applied to the lines, ground is applied and this automatically resets the time waiting circuits.

A phase A "N-cars time and reset" circuit is provided at 50 and a phase B circuit at 51. During a green signal on phase A (positions 1–4), the GY relay is deenergized thereby applying B+ on line 13B and ground on line 13A so that the phase B lane timers are counting their stopped cars while the number of cars circuit in phase A lane timers is reset. Similarly during a green signal on phase B, the opposite effect occurs.

THE LANE TIMERS

In FIG. 2A six lane timers are shown in block diagram: lane timers 1–3 are individual to three lanes in one roadway referred to as phase A; another three lane timers 4–6 are individual to traffic lanes in another roadway phase B intersecting said roadway. The lane timers each include the same components and have the same output terminals which are generally connected in parallel on the same phase. The ouput connections from each of the lane times of both phases are referred to by the same number except for the suffix A or B to refer to the particular phase. For example, the output terminals 34 from the A phase lane timers are connected in parallel and are all referred to as 34A; these same output terminals from the B phase lane timers are referred to as 34B.

However only Phase A Lane #1 lane timer 1 is completely shown in block diagram. The details of the elements within the individual blocks are shown in subsequent figures.

An input 52 is provided for receiving signals representing passage of a vehicle in the lane associated with the respective lane timer. These signals actuate a vehicle detector which then controls over line 53 an Actual Gap Circuit, Average Volume Density, and a Number of Cars Waiting Circuit.

The Actual Gap Circuit measures the actual time space or gap between two successive vehicles on the traffic lane associated with this lane timer.

The Average Volume Density circuit measures the rate of passage of vehicles in number of vehicles passing per unit of time (Traffic Volume) over a time period. This output is inversely proportional to the average vehicle gap.

A Time Waiting circuit measures the time that vehicles are held waiting in a lane by a red light while a Number of Cars circuit measures the number of cars in a lane held waiting by a red light. The varying signal voltages from the time waiting, number of cars and average volume circuits represent traffic measurements which vary an allowable gap between vehicles to vary the demand for green.

An Added Initial circuit is provided to vary the initial green time provided in one traffic phase in proportion to the number of cars that have been waiting on that phase.

A first comparator compares the actual vehicle gap output on line 113 with the average vehicle gap output signal on line 150. If the actual gap is greater than the average gap by a sufficient percentage an output is provided from the comparator and from an "OR" circuit on line 36. Similarly in comparator #2, the actual gap voltage on line 113 is compared with an electrical voltage signal on 160 representing a permissible gap limit which varies with the amount of vehicle waiting time on a red traffic phase; while in comparator #3, the actual gap is compared with an electrical signal on line 16A representing a permissible gap limit varying with an electrical signal at 16A coming from the number of cars circuit of phase B. This signal on 16A represents a permissible gap limit varying with the number of cars waiting on a red signal on phase B.

Thus if vehicle traffic on phase A decreases for example, the actual gap between vehicles will increase so that there will be a comparison output at 36 earlier in time. If all the other lane timers of phase A provide an ouput on their line 36, an output is provided from the "And" gate to operate trigger 60 and the PR relay if the traffic controller is operating on the A phase so that contacts 61 and 62 of the AB relay are closed. Thus a demand for right-of-way transfer is initiated when all the lane timers of that phase have exceeded their allowable gap.

Similarly if the controller is operating on the B phase, contacts 61 and 63 will be closed and relay PR will be operated when the actual gap of all the lane timers of phase B exceed the average gap limit or the time waiting gap limit or number of cars waiting gap limit circuits of phase B.

Operation of relay PR permits passage timer to terminate the particular traffic phase by applying ground in the reset circuit 45 of FIG. 2B over either line 25A or 25B.

The operation of the "added initial" of the lane timers and the other particular circuits of the lane timers and of the traffic controller and their overall cooperation will be apparent from the following detailed disclosure of the component parts. The same numbers are used throughout for the same lines and parts. However it should be remembered that this system controls two traffic phases and has two sets of lane timers and only one traffic controller. Accordingly lane timers must always know whether the controller is providing a green signal to the A phase and red on the B phase or vice versa; the AB and other relays serve as such an indicator and accordingly send information to the lane timers in the A phase or to the B phase or vice versa or may alternately receive information from the proper lane timers. Therefore the significance of the lines 23A or 23B for example should be apparent even though only one lane timer is completely shown.

Figure 3:
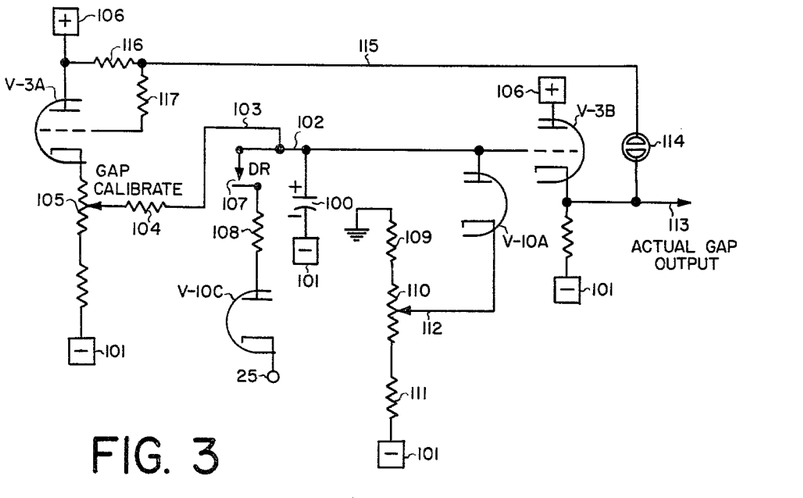
FIG. 3 is a schematic drawing of the circuit in any one of the lane timers for measuring the actual gap or spacing between two successive vehicles moving with a green signal.

FIG. 3 is a schematic circuit of an "ACTUAL GAP Timer" shown in block diagram in FIG. 2A. The term "actual" is used since it appears to be the best available term to indicate the present possible gap between the latest vehicle passing a vehicle detector in the lane and the next subsequent vehicle, or more particularly the elapsed time after the latest vehicle has passed the vehicle detector.

Condenser 100 charges to a voltage representing the spacing or gap between vehicles. With V–3A normally conducting, condenser 100 charges from negative 150 volt D.C. source 101 over lines 102 and 103 through resistor 104 and gap calibration potentiometer 105 through V–3A to the positive D.C. source 106.

As a vehicle, in the lane associated with the particular lane detector, passes over or under a vehicle detector in the lane, for example, the DR relay contacts 107 close to connect capacitor 100 and line 102 to a negative D.C. source at terminal 25 (25A or B in FIG. 2A or FIG. 2B) through resistor 108 and diode V–10C thereby effectively discharging condenser 100. As the vehicle leaves the detector, the contacts open and condenser 100 again starts charging. Accordingly if the time spacing between successive vehicles is large, the voltage on condenser 100 will rise to a high positive charge (less negative). Conversely, if the time spacing or gap between successive vehicles is short, the voltage on condenser 100 will be relatively low (more negative) before reset by DR contacts 107.

A clamp circuit is provided including diode V–10A and bleeder resistor 109–111. Accordingly if the gap between vehicles is large, for example, in the absence of vehicles, the charge on condenser 100 is clamped or limited to a negative 30 or 40 volts, for example, as determined by the setting of potentiometer arm 112.

Cathode follower V–3B has its grid connected to line 102 to provide at its cathode an output on line 113 representing the actual vehicle gap between two successive vehicles on the particular lane. A constant voltage neon lamp 114 is connected to output line 113 and over line 115 through resistors 116 and 117 to the plate and grid of V–3A. Feedback of the gap voltage on line 113 through lamp 114 raises the voltage on V–3A in proportion to the present charge on capacitor 100; accordingly a constant voltage difference is maintained between the present capacitor voltage and the available voltage to which it can charge so that the capacitor is always charging on the linear portion of its curve for all the varying levels of charge. Without such feedback, capacitor 100 would charge linearly at low voltage and then charge exponentially.

Terminal 25 in the respective lane timers is either grounded or at B minus. Assuming the actual gap circuit of FIG. 3 is associated with lane 1 of phase A, B minus is connected to terminal 25 (25A) during the A-green time and is grounded after the PR relay is operated by the lane timer of the A phase having exceeded their permissible gap as shown in block 45 of FIG. 2B. The application of B minus to terminal 25 permits reset of condenser 100 (gap measurement) while the application of ground prevents reset and permits use of the same condenser to generate a passage time to permit the last vehicle to enter the intersection before termination of the green on the A phase. Thus since terminal 25 is grounded, condenser 100 cannot discharge and is permitted to rise to a level representing passage time as well as its normal use of representing vehicle gap. The operation of the additional circuitry of the passage timer and the operation of the PR relay is further disclosed in FIG. 7.

Figure 4:
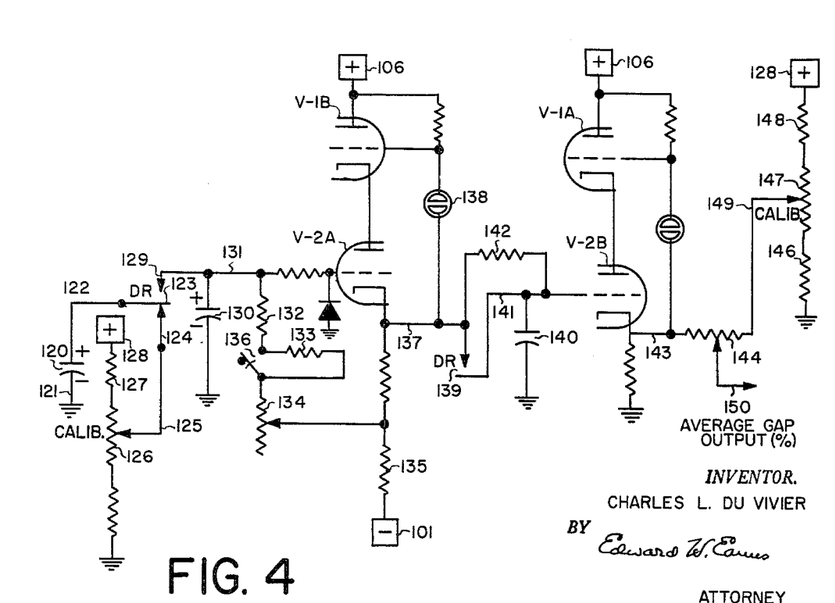
FIG. 4 is a schematic drawing of the circuitry for measuring the average volume or average gap between groups of vehicles as well as a percentage gap calibration circuit.

FIGURE 4 shows a schematic diagram of a Traffic Volume-Density type computer shown in block diagram of FIGURE 1. Condenser 120 is normally charged from ground 121 over line 122 through detector relay contacts 123 and 124 and line 125 to a calibration potentiometer 126, resistor 127 to positive D.C. source 128.

Passage of a vehicle operates the detector relay to connect contact 123 to 129, thereby "bucketing" or substantially transferring the charge of the small condenser 120 into the larger condenser 130. As the number of vehicles detected increases, the voltage on condenser 130 increases. During the gap between vehicles the two microfarad condenser 130 discharges slowly over line 131 through resistors 132–135 to the negative source 101 and back to ground. These resistors total approximately 20 megohms to provide a forty second RC discharge time. Accordingly condenser 130 and resistors 132–135 provide voltage on line 131 representing average volume over a forty second time period. If traffic volume is large, capacitor 130 will be charged more frequently and thus rise to a higher voltage representing this larger volume. Since some vehicle detectors are actuated twice for a single vehicle (as by both axles), switch 136 may short out or insert resistor 133 as desired to compensate for such difference in inputs.

Cathode follower V–2A has its grid connected to receive the average volume signal and provides an output of the signal at its cathode on line 137. Neon lamp 138 connects line 137 to the plate and grid of V–1B to insure a linearity of the cathode output at 137 with variations in input.

Condenser 140 is connected to act as a memory of the average volume. Detector relay contacts 139 are closed during the instant that a vehicle is passing in a lane. Thus condenser 140 is connected over line 141 and contacts 139 to line 137 so that condenser 140 assumes the potential of the average voltage on line 137. Contacts 139 then open and capacitor 140 retains this charge thereby remembering or storing the average volume during the time between vehicle actuations; this storage is of the average volume as of the last actuation.

Resistor 142 is a large (39 megohms) to act as a D.C. grid return for V–2B although it also permits a slight discharge from condenser 140.

V–1A and V–2B are connected in the same manner as was previously described in reference to V–1B and V–2A to provide a linear cathode follower output at 143.

The output at 143 is a positive voltage which increases with increase in the average traffic volume. As volume increases, the time gap between vehicles decreases. Accordingly the output voltage on line 143 is a measure of the average time gap between vehicles. The electrical value of this average gap signal is used in this invention to determine a permissible or allowable gap in the particular traffic phase for comparison with the actual gap between two vehicles on the phase. Thus variations in the average gap vary a limit beyond which the actual gap may not exceed. Potentiometer 144 is calibrated in percentage to provide a percentage of the average gap output above which the actual gap may not exceed.

Figure 7:
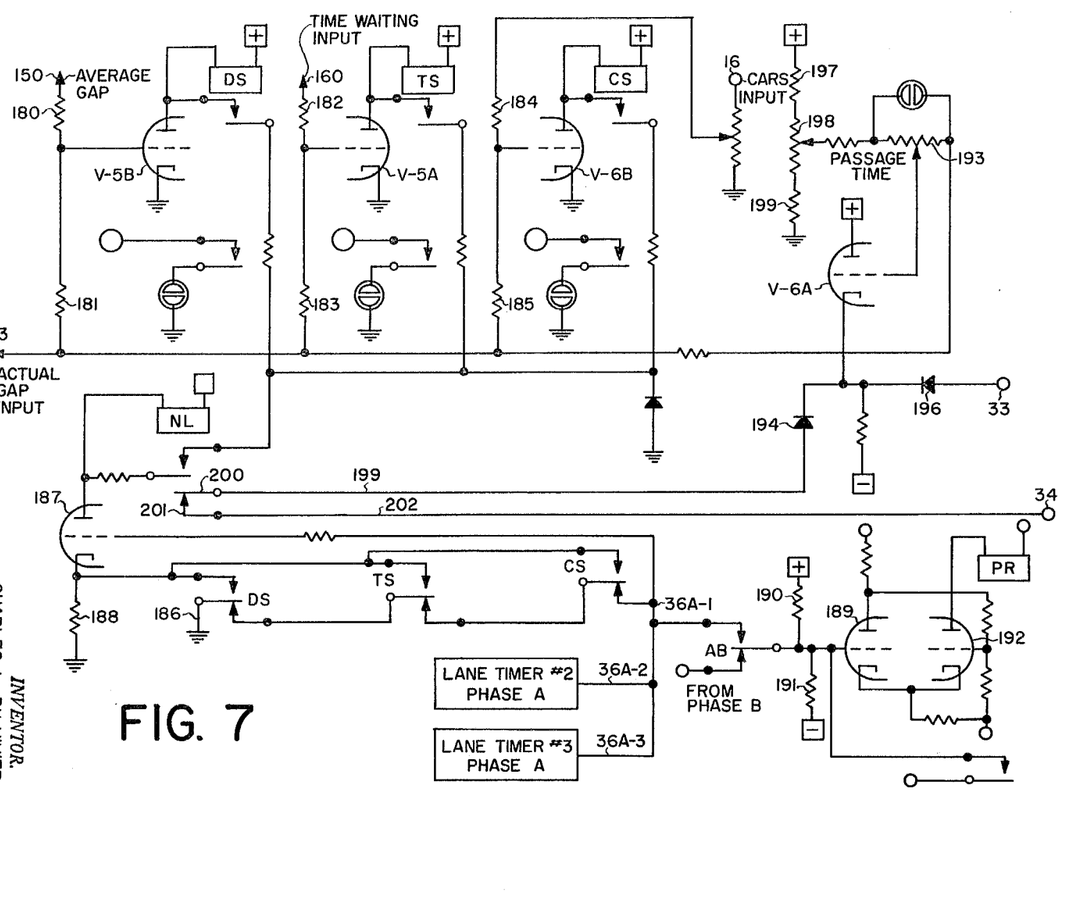
FIG. 7 illustrates a schematic diagram of the "OR" gap comparison circuit with the other lane timers of the same phase shown in block diagram connecting the outputs of the "OR" circuits of each to form an "and" circuit which then allows the passage time of the last lane timer demanding transfer to control the time of transfer.

A bleeder supply includes resistors 146–148 connected between ground and the positive 210 volt D.C. source 128. The voltage on line 149 is calibrated by adjustment of the potentiometer on resistor 147. Accordingly the potential on line 150 increases linearly in a positive direction with the average gap or volume measurement on line 143. The connection of line 150 to the first comparator is shown in FIGS. 2A and 7. It should be noted that the calibration voltage on line 149 maintains the potential on the right side of resistor 144 fixed while the left side of the resistor is varying with the voltage on line 143.

Figure 5:
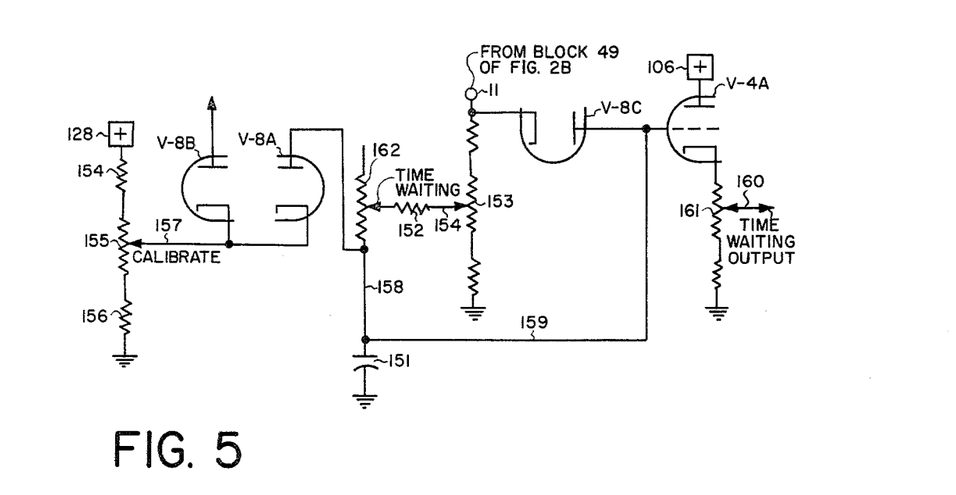
FIG. 5 is a schematic drawing of the time waiting circuit.

FIGURE 5 shows a schematic diagram of a preferred form of "time waiting" circuit which is shown in block diagram in FIGURE 2A under control of the "time waiting and reset circuit" 49 of FIG. 2B. The purpose of the time waiting circuit in each lane timer is to measure the time that vehicles on one phase or lane are held waiting by a red light in that phase and to utilize this information to reduce the permissible gap between vehicles extending the green time allocated to the other phase.

Accordingly as shown in FIG. 2, if a green signal is provided on phase A (positions 1–4 of the lineswitch), relay GY is deenergized and relay BM is deenergized if a vehicle is waiting on the B phase, so that as shown at 49 in FIG. 2B, B+ is applied through the back contacts of these relays to line 11A. Then as shown in FIG. 5, this application of B+ to terminal 11 (from 11A) will start the timing of condenser 151.

Conversely when a red signal is provided to the A phase, relays GY and BM are both energized to maintain ground on line 11A. However as soon as the first vehicle approaches the red signal, it actuates the vehicle detector to deenergize relay AM while GY is maintained energized to apply B+ to terminal 11B thereby causing the "time waiting" circuit in the lane timers of phase B to start timing.

In FIG. 5, assuming this time waiting circuit is in a lane timer associated with the A phase, terminal 11, is connected to 11A from block 49 of FIG. 2B and therefore is connected to B+ during A-green (B-red) when the first vehicle is stopped on the B phase (BM relay dropout).

Condenser 151 in the A lane timer then times the B phase waiting time by charging through the time waiting potentiometer 162, resistor 152, and the calibration tap 154 of potentiometer 153 to the positive voltage at terminal 11. Condenser 151 in a B phase lane timer is discharged at this time since line 11B from 49 of FIG. 2B is grounded. Similarly when the controller reverses to a B-green and A-red signal, the opposite result occurs.

A bleeder supply is connected between positive source 128 and ground through resistors 154, 156 and calibration potentiometer 155. Calibration potentiometer 155 is adjusted to provide a positive clamping potential on capacitor 151. As capacitor 151 charges in a positive direction to indicate time waiting on the red, this voltage is applied through lead 159 to output terminal 160 of the cathode follower V–4A. The amount of time waiting is proportional to the positive voltage at terminal 160. Clamp V–8A as adjusted at 155 sets a limit for rise in voltage of condenser 151 beyond the ordinarily used range.

Discharge of condenser 151 in a particular lane timer occurs during the red period of the traffic phase associated with that lane timer. The discharge path is from ground to condenser 151, lead 159 and diode V–8C to terminal 11 which is at ground during this period as was explained above. Potentiometer 161 is adjusted to vary the output at 160 and therefore provides another adjustable allowable or permissible gap or limit beyond which the actual gap may not go.

In summary, the lane timers associated with phase A start timing (during A-green) as soon as a vehicle actuation on phase B (red) drops out the BM (memory) relay. Similarly the lane timers associated with phase B (during B-green) start timing as soon as a vehicle actuation on the A phase (red) drops out the AM relay.

Figure 6:
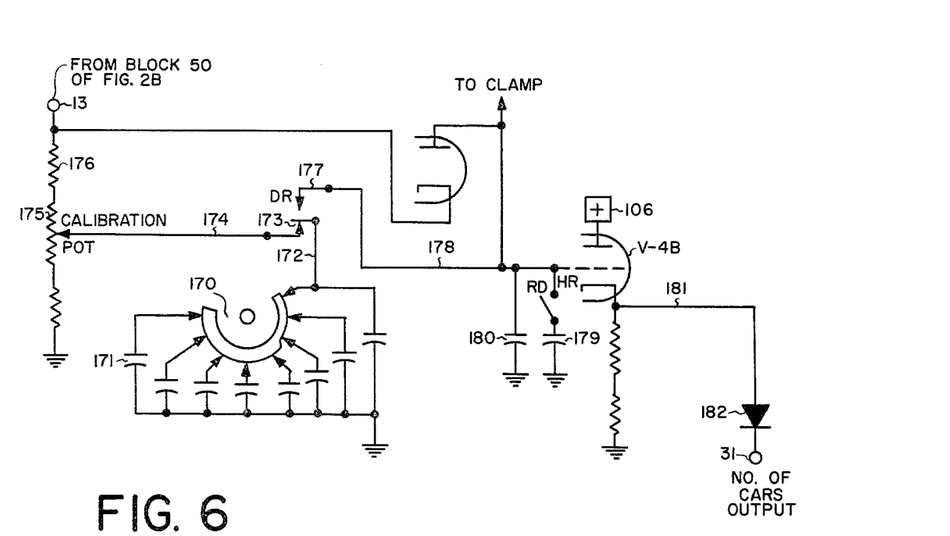
FIG. 6 is a schematic drawing of the number of cars waiting circuit.

Each of the lane timer units has a number of cars waiting circuit, a preferred form of which is shown in FIGURE 6. In FIG. 2A, it is seen that an output signal from the Number of Cars circuit of all the lane timer units associated with phase A are connected in parallel at 31A to an input 16B of all the lane timers of phase B. Similarly the output from the number of cars circuit of all the lane timers of phase B are connected in parallel at 31B to an input 16B of all the lane timers of phase A. In addition as shown in FIG. 2B, the number of cars circuit of the phase A lane timers are controlled from block 50 by ground on line 13A during A-green and B+ one line 13A during A-red. Thus each of the lane timers counts the cars waiting on the red signal of its respective phase and transmits this information to the lane timers of the opposite phase which are now in a green time period.

Now referring to FIGURE 6 switch 170 is adjustable to vary the number of condensers (171) which are connected to parallel from ground through lead 172, DR contacts 173, line 174, calibration potentiometer 175 and resistor 176 to terminal 13. The potential applied at terminal 13 determines whether condensers 171 are charged.

As discussed above terminal 13 for an A-lane timer is connected to 13A in block 50 of FIG. 2B so that B plus and ground are connected to terminal 13 during the B-green and A-green time periods respectively as determined by the GY relay.

In this A-red position, every vehicle actuation of the vehicle detector of the lane timer of phase A indicates another waiting vehicle. Accordingly each such vehicle actuation "buckets" or transfers a unit charge from the condenser 171 into condenser 180 through line 172, DR contact 177 and line 178. Condenser 179 may be placed in shunt with condenser 180 if the vehicle detector provides two actuations per vehicle. Thus the voltage on line 178 represents the number of cars waiting on the red on one phase. An output is provided on line 181 from the cathode of cathode follower V-4B through diode 182 to terminal 31 for controlling an input at 16 of the other lane timers as shown in FIG. 2A and FIG. 7. It should be noted that some traffic lanes either because of their position, size, length or other factors have different characteristics or should be treated differently. For example ten waiting cars on an exit lane from a throughway may be a traffic hazard if the tenth car is backed up to the throughway while the tenth car on a wide road with several passing lanes may be insignificant.

Accordingly this invention provides that the Number of Cars circuit is adjustable for the particular lane. This adjustment is the switch 170 which varies the number of condensers in parallel at 171. Thus, for example, if the lane in question has a large storage capacity, fewer condensers are connected in parallel at 171 so that the amount of charge transferred or bucketed in condenser 180 with each vehicle actuation is less than if the lane had low storage potential. Accordingly the output signal voltage at terminal 31 is a percentage of the actual number of cars waiting to a preset number of cars as for example the maximum desired or possible waiting cars on the lane in question.

Each of the lane timers has three comparator circuits, and an "OR" circuit as shown in FIGS. 2A and 7. The "OR" circuit outputs of all the lane timers of one phase are connected in parallel to a common junction at 36 in FIG. 7 to form an "AND" circuit. Accordingly when all of the lane timers in one phase have indicated a desire to terminate their green, the "AND" circuit provides an output to energize relay PR and to terminate the A-green after a passage time determined by the last lane timer which times out its gap or otherwise indicates a desire to terminate the green.

FIGURE 7 receives an input signal on terminal 113 (the output of FIG. 3) representing the actual gap between vehicles; a small gap is indicated by a large negative voltage while a large gap is represented by a small negative voltage. At 150 there is an input from the average volume density circuit of FIG. 4; the voltage at 150 is a large positive voltage for small gap between vehicles (large traffic volume) and a small positive voltage for large gaps (small volume).

At terminal 160 there is provided a time waiting voltage input from FIGURE 5 which is a small positive voltage for a short waiting time and a large positive voltage for a long waiting time.

At terminal 16 there is provided an input from the number of cars waiting circuit of the lane timers of the other phase. The voltage at terminal 16 is a positive voltage directly proportional to the ratio of the actual number of cars waiting to the maximum number of cars setting of the lane units on the other phase.

A comparision is provided between the actual gap voltage on line 113 with the average gap on line 150, the time waiting signal on line 160 and the number of cars waiting on line 16; the comparision circuits include resistors 180–185, tubes V–5A, V–5B, V–6B and relays DS, TS and CS.

If a fleet of vehicles is flowing along a lane, a large negative voltage exists on line 113 while a large positive voltage exists on line 150; in this case V–5B is held nonconducting. However, as the last car in the fleet passes the detector, the voltage on line 113 will become more positive (less negative) to energize V–5B and relay DS. The positive voltage at terminal 150 has remained substantially unchanged in this case because condenser 140 in FIG. 4 remembers the average gap of the fleet and is not reset until the next succeeding vehicle passes.

Now if the vehicles on the other phase have been waiting a long time, the voltage at 160 is sufficient to energize V–5A and relay TS if the voltage on line 113 indicates a large or substantial gap, but not if this voltage indicates a small gap.

Similarly if there is a large gap voltage on line 113 and a large number of cars waiting voltage on line 16, tube V–6B and relay CS are energized.

Accordingly either relays DS, TS or CS may be energized to indicate a desire to terminate green and so the above mentioned circuitry is an "OR" circuit. While relays and tubes are shown, it will be obvious that other forms of "OR" circuitry may be used. The above operation occurs in all of the lane timers for phase A during the A-vehicle green position 4 of the lineswitch and in position 9 for the lane timers of phase B.

Each of the lane timers has an output terminal 36 which is designated 36A–1, 36A–2, 36A–3 for phase A lane timers associated with lanes 1, 2 and 3 respectively and similarly 36B–1, 36B–2 and 36B–3 for phase B lane timers. The 36A leads are commonly connected and the 36B leads are commonly connected.

As seen in FIGURE 7, terminal 36 is grounded at 186 through the back contacts of the relays DS, TS and CS. Now if the DS or TS or CS relay of lane timer #1 of phase A operates, ground 186 is connected to the cathode of triode 187. The grid of 187 remains grounded since terminal 36 of this lane timer is connected to terminal 36 of the #2 and #3 lane timers in phase A. Tube 187 and relay NL in lane timer #1 are thereby energized to indicate that lane timer #1 is "not the last" of the phase A lane timers desiring to yield right-of-way.

Similarly the same operation may occur in lane timer #2 of phase A.

Now when the last lane timer of phase A indicates a desire to yield right-of-way by operation of its DS, TS and CS relay, the common terminal 36 is no longer at ground terminal 36 assumes a negative potential determined by bleeder resistors 190 and 191 which are connected between plus and minus sources. Accordingly triode 187 and relay NL in that lane timer are not energized, thereby indicating that it is the "last lane" timer to indicate a desire to yield right-of-way. Furthermore, this indicates that all the lane timers desire to yield since tube 189 cuts off with this negative voltage on its grid and tube 192 starts to conduct to energize the PR relay. Once this PR relay as shown at block 45 in FIG. 2B is energized ground is applied on line 25A (or 25B) preventing reset of the gap circuit (in FIG. 2A or FIG. 3) to permit generation of a passage time.

Accordingly condenser 100 in FIG. 3 is no longer reset at terminal 25 but may continue to charge from source 101 to the potential across cathode resistor 105. Since capacitor 100 started charging at the last vehicle actuation, it is already timing passage time. Therefore the voltage on line 113 in FIG. 3 now represents passage time for the last vehicle.

Returning to FIG. 7, this passage time voltage is applied across an adjustable passage time potentiometer 193; the other end of 193 connects to calibration potentiometer 198 which forms part of a bleeder circuit including resistors 197–199.

The passage time output voltage is derived at the cathode of V–6A and is coupled through diode 194 (by circuitry which is more clearly shown in FIG. 9) and line 199 through the normally closed NOT LAST (NL) contacts 200 and 201 to line 202 and output terminal 34. If this is an A phase lane timer terminal 34 is equivalent to line 34A in FIG. 2A; therefore the Passage Time Output is connected to position 4 of the sixth bank of lineswitch contacts to terminate the green on the A phase.

The lane timers which were not the last to respond, do not provide a passage time output at their terminal 34 since their NL contacts are open. Thus the passage time additional green is controlled by the heaviest traffic lane, i.e. the last to have a sufficient gap between vehicles, as is preferable.

The added initial circuit is shown in FIG. 8. The purpose of this circuit in any lane timer is to count the number of vehicles waiting on a "red" signal in that lane, and then subsequently during a "green" signal in that lane extend the minimum green time in that lane in proportion to the number of cars waiting.

Assume that the added initial circuit of FIG. 8 is a component of an A phase lane timer, therefore the vehicles are counted on the A phase during A-red and this count determines the A-MINIMUM green time on phase A in position 2 of the lineswitch.

During A-rest or A-vehicle periods (positions 3 and 4 of the lineswitch), the A phase memory relay AM is energized; this supplies B plus to terminal 23 through the AM relay contacts in block 46. Resistors 213, 214 and 215 form a potential divider. Capacitor 210 charges from ground through line 211, diode V–9B to the calibrated potential on 213 as determined by tap 212. The voltage on condenser 210 provides an initial reset level as determined by the calibration potentiometer.

Subsequently during the B-green signals (positions 6–10 of the lineswitch), the AM relay is deenergized thereby terminating B plus on terminal 23; however condenser 210 retains its charge level set at 212. During this time, vehicles on the A phase are being stopped by a red signal. Condenser 215 can then discharge slightly into condenser 216 through the back contacts of the detector relay and diode V–9C. Each such vehicle stopped by the red signal, actuates the vehicle detector to discharge condenser 216 over detector contact 217 to terminal 24 (line 24A) and AB relay contacts 218 and 219 to ground. Thus the amount of charge removed from condenser 210 is proportional to the number of cars waiting on the red signal. Condensers 210 and 216 have values of 5.0 and .1 microfarads respectively so that there is no substantial decrease in the charge 210 without vehicle actuation, to discharge 216.

Now as the controller returns to the A-MINIMUM green position 2 of the lineswitch, the MIN relay is closed as shown in FIG. 2B. This connects B plus to the timing input terminal 12 to permit the start of the timing of the A phase Added Initial Time by permitting condenser 210 to charge over line 211, diode V–9A, resistor 220, the Added Initial per car potentiometer 221, line 224, calibration adjust 225, potentiometer 222 and resistor 223 over line 12A, the back contacts of the AB relay, line 226, and the normally open MIN contacts 227 and 228 to B plus. Accordingly if a large number of vehicles had been waiting (thereby discharging condenser 210 to a low level) it will take a longer time for condenser 210 to rise to any desired level.

The voltage on condenser 210 is coupled through diode 230 to output terminal 35 and line 35A to position 2 on bank 6 of the lineswitch to control the A-MINIMUM timing.

During the timing of the Added Initial charging of capacitor 210, the discharge path of condenser 210 through diode V–9C is blocked by charging condenser 216. Each time the vehicle detector is actuated during the A-green minimum timing, condenser 216 is charged through DR contact 217, terminal 24, line 24A, to back contacts of the AB relay and through MIN contacts 231 and 232 to B plus; this voltage blocks diode V–9C to prevent discharge of condenser 210. Subsequently in position 3, B plus at 12 is terminated and the cycle is repeated.

Figure 9:
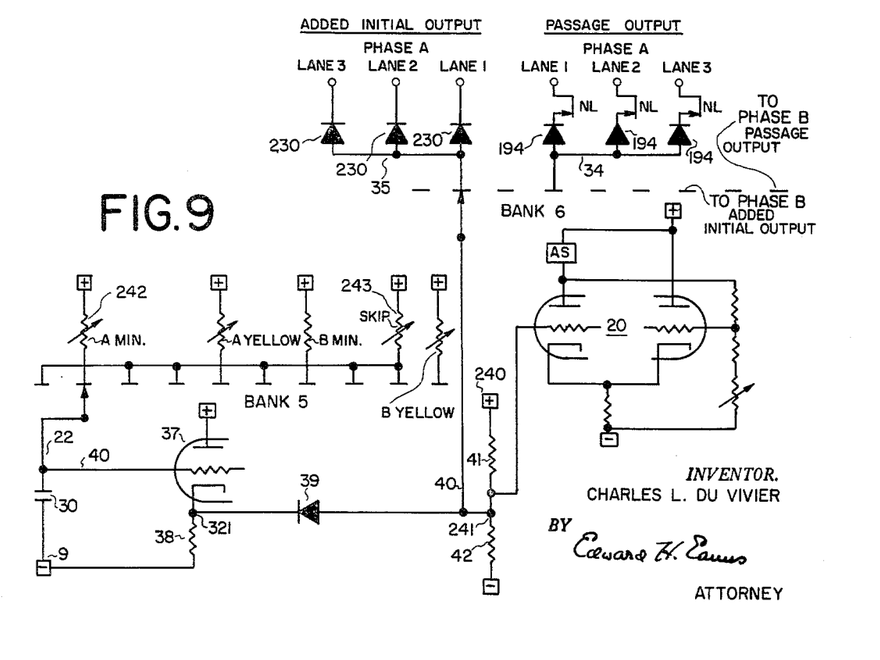
FIG. 9 is a schematic drawing of the timing circuit.

FIG. 9 shows the Added Initial and Passage time outputs from three Phase A Lane Timers cooperating with the timing circuit of condenser 30 to terminate the various signals by energizing the AS relay.

Energization of relay AS to terminate any of the time periods is determined by the potential at junction 241. The potential at 241 is controlled by two parallel paths; current flows from source 240 through resistor 41 to either diode 39 and resistor 38 to B minus, or over line 40 through position 2 of the lineswitch, common lead 35 and the individual diodes 230 of the individual phase A lane timers through the cathode resistors of V–7B (as shown in FIG. 8) to ground.

While the minimum time as timed by condenser 30 and resistor 242 is timing, the added initial circuits of all lanes on the same phase are also timing. The timer having the lowest voltage at point 320 will cause a current to flow from source 240 thru resistor 41 to lower the potential of point 241 to this lowest value. Since point 241 will be below that of point 320 (or 321) of all other timers, their respective diodes 230 (or 39) will be reverse biased and will not be conducting. The voltage at point 241 is therefore the same as the lowest of the several timer outputs. When the last such timer to end its interval times out, it permits the voltage at point 241 to rise to the triggering point of trigger 20, thus ending the interval.

Similarly in position 4 of the line switch the passage timer output controls the potential at junction 241.

In addition similar circuits may be shown in positions 7 and 9 for phase B added initial and passage.

The use therefore of the minimum and skip resistors in bank 5 is to set a minimum green time below which even a short added initial or passage time will not step the AS relay.

Figure 10:
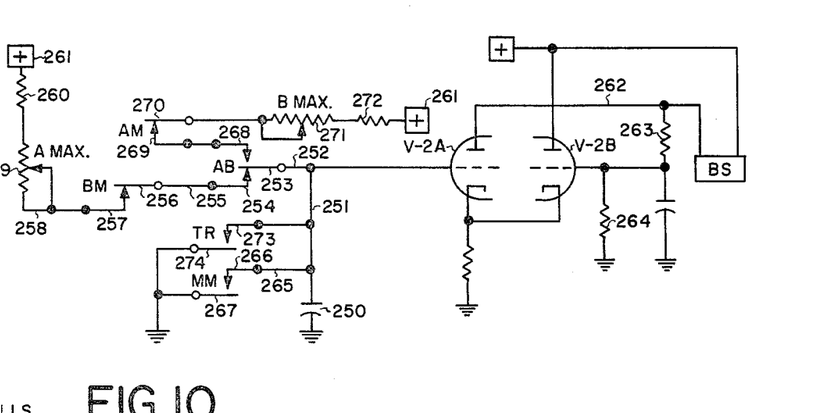
FIG. 10 is a schematic drawing of the "maximum" timing circuit.

FIG. 10 shows a maximum timing circuit. Such maximum timing circuits are conventional in traffic controllers to terminate the green period and prevent excessive extension of the green by other vehicle actuated circuits.

In the A-green position, B-Max condenser 250 is charged over lines 251, 252, the back contacts of 253 and 254 of AB relay, line 255, the back contacts 256 and 257 of relay BM (deenergized), line 258 and through the A-Max adjustable potentiometer 259 and resistor 260 to a positive source 261. When condenser 250 has timed out its maximum period V–2A and relay BS are energized; the voltage on line 262 and across resistors 263 and 264 drops, thereby deenergizing V–2B.

Relay BS causes the motor magnet MM to be energized (not shown) to step the lineswitch out of A-green position. Condenser 250 is discharged to ground through line 265 and MM contacts 266 and 267 so that it is ready to time B-Max; relay BS has dropped out since V–2A is normally non-conducting.

In the B-green period, condenser 250 charges through lines 251, 252, contacts 253 and 268 of the AB relay (energized), contacts 269 and 270 of the AM relay (deenergized), the adjustable B-Max resistor 271 and resistor 272 to source 261. After B-Max has timed out, condenser relay BS is again energized to step the lineswitch out of B-green. In general, the B-Max circuit terminates the green only if some other circuit (passage for example) has not already terminated the green. Also the Max circuit is a safety device in case the other circuits fail. TR contacts 273 and 274 are provided to discharge condenser 250 if it is desired to stop timing in the controller.

Figure 11:
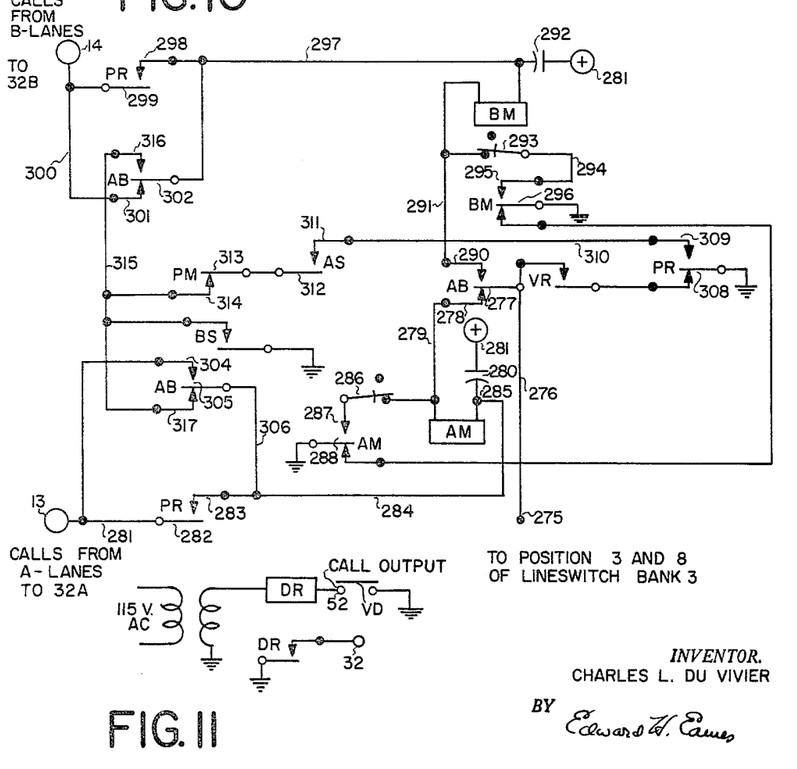
FIG. 11 is a schematic drawing of the call memory and automatic recall circuit.

FIG. 11 shows in schematic form the "call memory and automatic recall" circuit which is shown in block diagram at 43 in FIG. 2B. Input terminals 13 and 14 are shown for receiving calls from the A and B lanes on lines 32B and 32A respectively from the lane timers as shown in FIG. 2A; the vehicle detector in each of the lane timers when actuated, provide ground over the lines 32.

During A-green rest period, relay AM is energized since ground is connected from bank 3 of the lineswitch to terminal 275 over line 276, the back contacts 277 and 278 of AB relay, line 279, the AM relay, and condenser 280 to A.C. source 281; relay AM is a resonant type relay and is locked in over Recall contacts 286 and AM contacts 287 and 288.

Now if the controller is about to terminate A-green and is in its passage time interval, relay PR is energized. Accordingly if a vehicle is approaching on the A phase, it will not have sufficient time to pass through the intersection. Therefore, the vehicle actuation by this vehicle on the A lane provides ground at 32A which grounds terminal 13 to place a "call." This ground is connected over line 281, PR contacts 282 and 283 and line 284 to the junction 285 between the AM relay and condenser 280 to thereby deenergize the AM relay and effectively remember this call to subsequently recall the controller to provide another A-green period after the B-green period.

A similar operation occurs for the BM relay. This relay is energized in the B-rest position 8 of the lineswitch by the ground at terminal 275, line 276, AB contacts 277 and 290, line 291, the BM relay, condenser 292 and A.C. source 281. Relay BM locks in over the Recall switch contacts 293, line 294 and BM contacts 295 and 296 to ground.

Should a vehicle appear on the B lanes during the B passage, a "call" as provided at terminal 14, provides ground through PR contacts 299 and 298 to line 297 thereby deenergizing BM relay (both sides grounded).

Waiting cars on an opposite phase are also remembered. For example, if the controller is in the A-green position (relay AM energized), a call from the B lane (as by a waiting car), provides ground at 14, through line 300, AB contacts 301 and 302 to line 297 to deenergize BM if it is not already deenergized. Similarly calls from the A lane drop out the AM relay during a B-green phase over line 303, contacts 304 and 305 and line 306.

Now, as previously described, as the controller leaves position 4 or 9 of the line switch it checks to determine if one of the lane timers has an unexpired passage time; if an unexpired passage time exists, relay PM is deenergized. Accordingly as the passage relay PR is energized, ground is connected through PR contacts 308 and 309, line 310, AS relay contacts 311 and 312 (when AS is energized as by termination of the Passage Interval) PM contacts 313 and 314 to 315; from here the ground is connected to either AB contacts 316 or 317 to either lines 297 or 284 to deenergize either the BM or AM relay depending upon the particular phase of the controller.

Having thus described my invention, it will be obvious that numerous equivalent of my invention will be obvious to those skilled in the art. Accordingly my invention is described in the following claims.

I claim:

1. A vehicular traffic control system for controlling "stop" and "go" signals at a plurality of intersecting streets having the intersection crossed by multiple traffic lanes of multi-lane streets, said control system having a plurality of phases of traffic control said system comprising individual timer means for each of the separate multiple traffic lanes of one street, timer means for each of the multiple traffic lanes of an intersecting street, each timer means including means for measuring the actual time gap between successive vehicles passing a selected position in each of the multiple traffic lanes of a "go" street, means for establishing an allowable time gap for such vehicular movement as a function of traffic volume and movement on the intersecting streets, means for comparing the actual time measured gap with the allowable time gap of the individual lane to develop an output control signal in response to the actual gap between successive vehicles exceeding the established allowable gap, and an adjustable passage-time timer means; means for selectively combining all control signals developed in each of the multiple lanes of one street for indicating the last of the lane timer means on the street which has exceeded its established allowable time gap, and means for reversing "go" and "stop" signals on said intersecting streets under the control of the said last of the passage-time timer means of the last lane timer means so indicated.

2. A vehicular traffic control system as in claim 1 and further including means for sensing unexpired passage time of measuring means which are not the last to exceed their allowable time gap upon such termination of the "go" signal, and means for subsequently providing another "go" signal to said one street in response to such sensed unexpired passage time.

3. A vehicular traffic control system as in claim 1 in which said means for establishing an allowable time gap include means for measuring the average time gap on the same lane as the actual time gap has been measured, and means for measuring the time and number of cars waiting on a lane intersecting said same lane.

4. A vehicular traffic control system as in claim 1 in which said means for establishing an allowable time gap include a plurality of traffic measuring means to provide a plurality of allowable time gaps, and in which the means for comparing include means for comparing each of said plurality of allowable time gaps with said actual time gap for providing said output in response to said actual time gap exceeding any one of said allowable time gaps.

5. A vehicular traffic control system as in claim 1 in which said passage time timer means and actual gap timer means include a condenser common to both timers and means for varying the charge on said condenser from an initial value for timing, and further including means for resetting the charge on said condenser toward said initial value in response to vehicle actuation for indicating the gap time period, and means for preventing reset in response to all the lane timers on one street exceeding their respective allowable time gap.

6. A vehicular traffic control system as in claim 1 in which the comparing means include relay circuitry individual to each of the lane timers and in which the relay contacts of each lane timer act as an OR-circuit and in which the contacts of the plural lane timers along one street are connected to act as an AND-circuit to indicate the last lane which exceeded its allowable time gap.

7. A vehicular traffic control system as in claim 1 and said comparison means including switching elements individual to the respective allowable time gap circuits in the respective lane timers of one street and means for operating the one of the switching elements in each lane timer which had its actual time gap exceed its lowest allowable time gap, and circuit means interconnecting the operated switching elements of the several lane timers for said one street for indicating that all of the lane timer units have exceeded their lowest allowable time gap and for determining the last such lane timer to so exceed its allowable time gap.

8. A traffic control system as claimed in claim 1 having means for transferring right-of-way from one multi-lane traffic phase to another multi-lane traffic phase after a passage time, and means for establishing the passage time in response to vehicle spacing between successive vehicles in the same lane in said one phase exceeding a predetermined allowable spacing between successive vehicles, and wherein said means individual to each of the plurality of lanes of each phase for measuring the time gap between vehicles includes a condenser and a resistor serially connected, means to connect a source of power for charging said condenser, and means responsive to vehicle actuation on said individual lane of said one phase for discharging said condenser, and wherein said means for comparing the actual spacing between successive vehicles in the same lane is represented by the charge on said condenser with a selected electrical signal representing an allowable spacing between vehicles, means for disabling said discharge means at times when the actual spacing exceeds the allowable spacing and for making effective a passage time using the same condenser as for measuring the actual spacing.

9. A multiple-lane traffic control system as claimed in claim 1, such system including means for developing a signal voltage proportioned by the average of the time gaps between each two vehicles of said group of successive vehicles, and means operated by passage of each of said vehicles for storing the developed voltage of average gap time duration as then existing, means for substantially preventing decrease of said stored voltage between successive vehicle passages along the measured street, a potentiometer, a bleeder supply, means connecting one-terminal of said potentiometer to said bleeder and the other terminal to the voltage source representative of the average gap between vehicles in the measured phase, and means connecting the tap of said potentiometer for comparison with the actual gap.

10. A multiple traffic control system as claimed in claim 9 and which includes means for adjusting said poteniometer for permitting an output from the comparison circuit when the actual gap has exceeded the average gap by a desired percentage, and in which said bleeder includes means for adjusting said bleeder for calibrating said potentiometer over a range of allowable gaps.

11. In a traffic control system having means for extending right-of-way on one traffic phase and having means for preventing transfer to another traffic phase by reset of a lane-timer means by actuation of successive vehicles on said traffic phase within a maximum limit as in claim 1 the improved combination comprising a condenser and charging resistor adapted to be connected to a source of power to vary the charge on said condenser from an initial value toward a different final value for said timer means, discharge means for removing the charge on said condenser to restore said initial value in response to vehicle actuation on said one phase having right-of-way to so reset said timer, a cathode follower component having said condenser coupled to its input, a first voltage responsive device coupled to the output of said cathode follower to be operated in response to the charge on said capacitor reaching a predetermined level and a second voltage responsive device coupled to the output of said cathode follower to be operated at another level of charge of said capacitor than said first responsive device, and an adjustable preset constant voltage source included in the output circuit of the cathode follower and the input circuit of said second voltage responsive device to establish the second response level so that the same capacitor may provide two different time functions reset from the same traffic actuation related to said right-of-way extension.

12. A traffic control system for the intersection of two roads of which at least one has more than one traffic lane, said system including "stop" and "go" traffic signal circuit means for controlling the right-of-way on the respective roads, traffic actuated means individual to at least two lanes of one of said roads and to at least one lane of the other road, cyclic control means for operating said signal circuit means and having a cycle including means for operating the "stop" signal for one of said roads and the "go" signal for the other of said roads, timing control means for controlling said cycle, control means to extend the period of operation of said "go" signal for said other road and said "stop" signal for said one road for a time increment in response to actuation of said traffic actuated means for said other road, said timing control means including further control means individual to at least two lanes of said one road and each controlled by the traffic actuated means of its individual one of the last mentioned two lanes for providing an electrical control output for progressively reducing said time increment in accordance with the number of traffic actuations in the individual said one lane when effective, and means individual to said further control means to preset a low limit for said increment for a predetermined number of traffic actuations and comparison circuit means for making effective for so reducing said time increment only the further control means having said electrical control output corresponding to the highest ratio of actuations to said predetermined number.

13. A traffic control system for multi-lane intersecting streets comprising a traffic controller for alternately according "stop" and "go" signals in the respective streets, first timing control means responsive to vehicle actuations in one street, second timing control means responsive to vehicle actuations in the other street intersecting said one street, said first and second timing control means each including means for measuring the time gap between successive vehicles in each of the individual lanes of the multi-lane intersecting streets during accord of a "go" signal on one of such streets, means to determine the number of vehicles waiting for intersection access on the other of such streets during the period of a "stop" signal, and means for comparing the respective time gap measurements with information from each other street representing an allowable time gap for the lane in use as determined by the number of cars waiting in individual lanes on the other multi-lane intersecting street during a "stop" signal on said other street, and means for varying said allowable time gap as a function of the highest percentage of the number of cars waiting to the maximum number of cars corresponding to the allowable storage space in the several lanes.

14. A traffic control system as claimed in claim 13 wherein the gap measuring means include a condenser timing circuit and means for resetting said condenser timing circuit in response to vehicle actuation in the individual lane on said one street, and comprising also means for determining whether the gap between vehicles as represented by said condenser charge has exceeded a permissible level, and means for disabling said reset means in response to a determination that the allowable gap has been exceeded, said means for disabling including means for making effective a passage timer for terminating said right-of-way.

15. In combination, a vehicle detector responsive to vehicle actuation by each of a succession of vehicles travelling along the same lane passing a common point in one traffic phase, a first condenser, a charging circuit for cahrging said condenser between detector actuations, and means for discharging said condenser in response to each such vehicle actuation so that the magnitude of the charge on said condenser is representative of the spacing between two successive vehicles travelling along the same lane in said phase, a second condenser, means normally to charge the said condenser to a magnitude representing a unit charge, a third condenser, a resistor connected in parallel with said third condenser, means for transferring said unit charge into said third condenser in response to each said vehicle actuation so that the voltage across said parallel resistor and condenser represents average traffic volume over a time period, means for storing the charge representing such average volume at each actuation, means for preventing any substantial leakage of charge in said stored signal between actuations, and means for comparing said stored signal with the voltage across said first condenser for initiating a transfer of right-of-way from said one traffic phase to another traffic phase.

16. A vehicular traffic control system for displaying "stop" and "go" signals alternately in a plurality of intersecting streets having multiple traffic lanes in each street comprising timer means individual to each of the separate multiple traffic lanes of the intersecting streets, each timer means including means for measuring the actual time gap between successive vehicles passing a selected position in its respective lane of a street having the "go" signal displayed therein, said actual time gap being measured from the time of passage of the latest said vehicle passing said position in its respective lane, means for establishing an allowable time gap for such vehicular movement in the respective lane, said allowable time gap being variable in response to traffic in the intersecting streets, means for comparing the measured actual time with the allowable time gap to develop a yield control signal indicative of an excess in time of the actual gap between successive vehicles compared to the established allowable gap for the respective lane, and an adjustable passage-time timer means for timing a passage time measured from said time of passage of said latest vehicle in the respective lane; means for selectively combining all of said yield control signals individually developed in the respective timer means of the multiple lanes of one street for selecting the passage-time timer means of the last of the timer means on said one street in which said measured actual time gap has exceeded said established allowable time gap and means for reversing the "go" and "stop" signals on said intersecting streets under the control of said selected passage-time timer means when the passage time thereof exceeds the allowable gap for its associated lane.

References Cited by the Examiner

UNITED STATES PATENTS

| | | | |
|---|---|---|---|
| 2,135,472 | 11/1938 | Renshaw | 340—7 |
| 2,750,576 | 6/1959 | Beaubien | 340—37 |
| 2,925,583 | 2/1960 | Jeffers | 340—37 |

NEIL C. READ, *Primary Examiner.*

THOMAS B. HABECKER, *Examiner.*